United States Patent
Sasaki et al.

(10) Patent No.: US 8,183,957 B2
(45) Date of Patent: May 22, 2012

(54) RADIO COMMUNICATION APPARATUS

(75) Inventors: Yasufumi Sasaki, Kanagawa (JP); Takuji Mochizuki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 368 days.

(21) Appl. No.: 12/385,838

(22) Filed: Apr. 21, 2009

(65) Prior Publication Data

US 2009/0289739 A1    Nov. 26, 2009

(30) Foreign Application Priority Data

May 26, 2008    (JP) .................................. 2008-136714

(51) Int. Cl.
*H03H 7/46*    (2006.01)
*H01P 5/12*    (2006.01)

(52) U.S. Cl. .......................... 333/132; 333/126; 333/129

(58) Field of Classification Search ........... 333/126–135
See application file for complete search history.

(56) References Cited

U.S. PATENT DOCUMENTS

| | | | | |
|---|---|---|---|---|
| 4,556,856 A | * | 12/1985 | Presser | 333/124 |
| 5,774,193 A | * | 6/1998 | Vaughan | 348/723 |
| 6,115,426 A | | 9/2000 | Fujimoto et al. | |
| 6,278,341 B1 | * | 8/2001 | Lindqvist | 333/126 |
| 2003/0001693 A1 | * | 1/2003 | Guitton et al. | 333/170 |
| 2005/0054383 A1 | | 3/2005 | Webster et al. | |

FOREIGN PATENT DOCUMENTS

JP    10-210099    8/1998

* cited by examiner

*Primary Examiner* — Robert Pascal
*Assistant Examiner* — Kimberly Glenn
(74) *Attorney, Agent, or Firm* — McGinn Intellectual Property Law Group, PLLC (57) ABSTRACT

There is provided a radio communication apparatus for transmitting transmission signals of the channel CH1 and the channel CH2, including a first antenna, a second antenna, a dual-band transmitting/receiving circuit having a first terminal for the channel CH1 and a second terminal for the channel CH2, a first branching circuit configured to receive a transmission signal from the first terminal or the second terminal, a second branching circuit configured to divide the transmission signal from the first branching circuit between the first antenna and the second antenna, and a transmission line configured to connect the first branching circuit and the second branching circuit.

7 Claims, 6 Drawing Sheets

RELATED ART

RADIO COMMUNICATION APPARATUS

BACKGROUND

1. Field of the Invention

The present invention relates to a radio communication apparatus and, particularly, to a radio communication apparatus including a first antenna and a second antenna.

2. Description of Related Art

A method of processing signals in different frequency bands with use of two antennas is disclosed (United States Patent Publication No. 2005/0054383). In this method, signals of 5 GHz and 2.4 GHz are detected using two antennas. Then, which of the signals from the two antennas is to be used is determined according to a control signal. Further, the signals of 2.4 GHz and 5 GHz are divided by a diplexer (branching circuit with filter). The control signal is supplied from a baseband processor including an OFDM processor to a switch placed between the antennas and the diplexer.

As a technique related thereto, a communication apparatus that performs transmission and reception using a plurality of antennas is disclosed (Japanese Unexamined Patent Publication No. 10-210099). The communication apparatus includes a branching circuit that divides a high-frequency signal into several carrier frequencies. The communication apparatus then collects the signal divided by the branching circuit and demodulates it.

Figure 8:
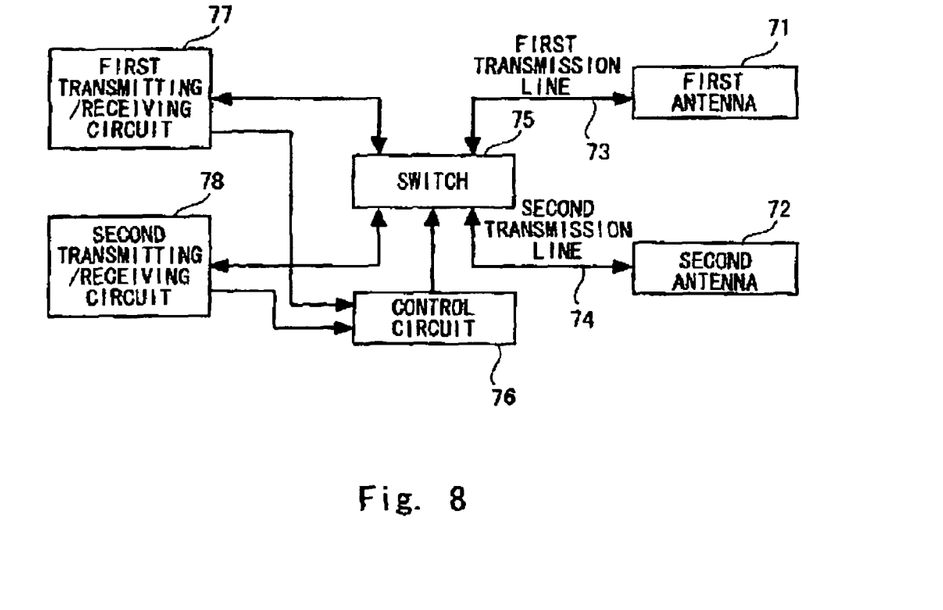
FIG. 8 is a block diagram showing the configuration of a communication apparatus disclosed in Japanese Unexamined Patent Publication No. 10-210099 in a simplified form.

The configuration of the communication apparatus disclosed in Japanese Unexamined Patent Publication No. 10-210099 is described hereinafter with reference to FIG. 8. FIG. 8 is a block diagram showing the apparatus configuration disclosed in Japanese Unexamined Patent Publication No. 10-210099 in a simplified form. Referring to FIG. 8, a first antenna 71 is connected to a switch 75 through a first transmission line 73. Further, a second antenna 72 is connected to the switch 75 through a second transmission line 74. The first antenna 71 and the second antenna 72 are dual-band antennas. A control signal from a control circuit 76 is input to the switch 75. The antenna to be used by the switch 75 is switched according to the control signal.

A received signal from the switch 75 is input to a first transmitting/receiving circuit 77 or a second transmitting/receiving circuit 78. The first transmitting/receiving circuit 77 is a circuit for 2.4 GHz signals, and the second transmitting/receiving circuit 78 is a circuit for 5 GHz signals. The first transmitting/receiving circuit 77 and the second transmitting/receiving circuit 78 are configured by a baseband processor, an RF circuit that converts an RF signal into a baseband signal and connects it to the baseband processor, and so on. In this example, one of the first antenna 71 and the second antenna 72 is selected by the switch 75. The switching of the antenna is performed according to the power level of the received signal. The antenna with a higher power level is selected.

SUMMARY

The present inventors have found a problem that the method disclosed in Japanese Unexamined Patent Publication No. 10-210099 fails to obtain a sufficient diversity effect because it uses the signal from only one antenna. Further, it is necessary to provide a circuit for measuring the power level of the received signal in order to switch the antennas. This raises the need to place a switch, a control circuit, a measuring circuit and so on, which complicates the apparatus configuration. Particularly, because it is difficult to incorporate the branching circuit with filtering function into an LSI including the baseband processor, it is necessary to place the switch, the control circuit and so on as separate circuits. Further, it is necessary to add the control circuit and its lines in association with the transmitting/receiving circuits. This makes the configuration more complicated.

A first exemplary aspect of an embodiment of the present invention is a radio communication apparatus which includes a radio circuit including a first terminal to receive a signal having a frequency belonging to a first frequency band and a second terminal to receive a signal having a frequency belonging to a second frequency band different from the first frequency band, to perform given processing on a signal input through the first terminal or the second terminal, a first branching circuit to output an input signal to either one of the first terminal and the second terminal according to a frequency band to which a frequency of the input signal belongs, a first antenna and a second antenna mounted separately and capable of receiving signals having frequencies belonging to the first frequency band and the second frequency band, and a second branching circuit to combine a signal received by the first antenna and a signal received by the second antenna and supplies the combined signal to the first branching circuit. Because the above-configuration uses the first and second antennas, it is possible to achieve a high diversity effect. Further, because it eliminates the need to add a control circuit that outputs a control signal between the branching circuit and the antennas, it is possible to simplify the apparatus configuration.

A second exemplary aspect of an embodiment of the present invention is a radio communication apparatus which includes a radio circuit including a first terminal and a second terminal, to output a signal having a frequency belonging to a first frequency band from the first terminal and output a signal having a frequency belonging to a second frequency band different from the first frequency band from the second terminal, a first branching circuit to receive the signal output from the first terminal or the signal output from the second terminal and output the input signal, a second branching circuit to divide the signal output from the first branching circuit into a first signal and a second signal, a first antenna to receive and send the first signal, and a second antenna to receive and send the second signal. Because the above-configuration uses the first and second antennas, it is possible to achieve a high diversity effect. Further, because it eliminates the need to add a control circuit that outputs a control signal between the branching circuit and the antennas, it is possible to simplify the apparatus configuration.

According to the exemplary aspects of an embodiment of the present invention described above, it is possible to provide a radio communication apparatus capable of achieving a high diversity effect with a simple configuration.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

An exemplary embodiment of the present invention is described hereinafter. The explanation provided hereinbelow merely illustrates the exemplary embodiment of the present invention, and the present invention is not limited to the below-described exemplary embodiment. The description hereinbelow is appropriately shortened and simplified to clarify the explanation. A person skilled in the art will be able to easily change, add, or modify various elements of the below-described exemplary embodiment, without departing from the scope of the present invention. In the figures, the identical reference symbols denote identical structural elements and the redundant explanation thereof is omitted.

Figure 1:
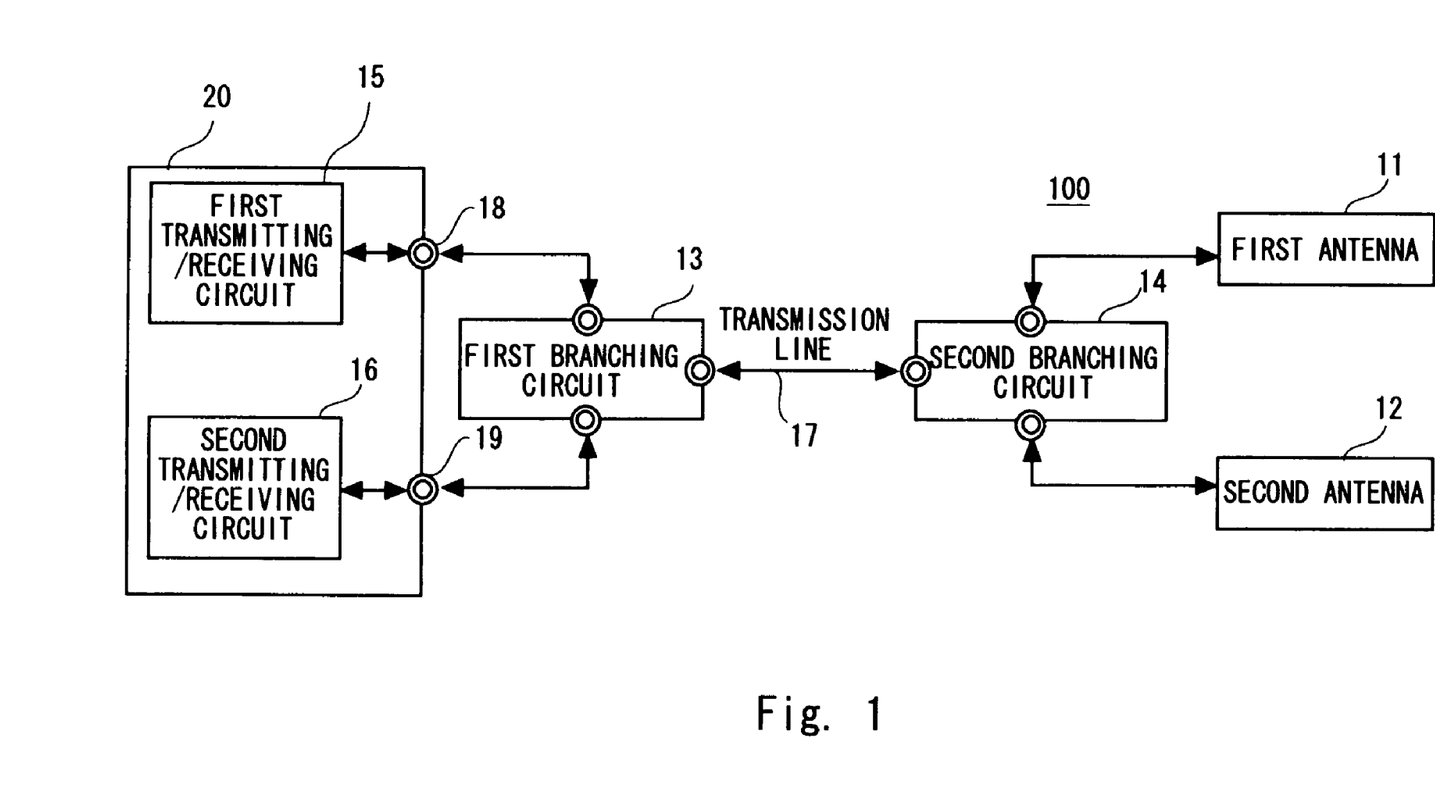
FIG. 1 is a block diagram showing the configuration of a radio communication apparatus according to an exemplary embodiment of the present invention.

The configuration of a radio communication apparatus according to an exemplary embodiment of the present invention is described hereinafter. FIG. 1 is a block diagram showing the configuration of a radio communication apparatus according to the exemplary embodiment. A radio communication apparatus 100 includes a first antenna 11 and a second antenna 12 for performing radio communication. The radio communication apparatus 100 further includes a first branching circuit 13, a second branching circuit 14, a radio circuit 20 and a transmission line 17. The radio circuit 20 includes a first transmitting/receiving circuit 15, a second transmitting/receiving circuit 16, a first terminal 18 and a second terminal 19. The first terminal 18 is placed for the first transmitting/receiving circuit 15, and the second terminal 19 is placed for the second transmitting/receiving circuit 16. A specific example of the radio circuit 20 may be a module incorporating a semiconductor integrated circuit (LSI) and a functional component.

The following description is based on the assumption that the radio communication apparatus 100 is a dual-band radio. Thus, the radio communication apparatus 100 handles transmission signals and received signals in different frequency bands. For example, the radio communication apparatus 100 transmits and receives signals of the channel CH1 and the channel CH2. The signals of the channel CH1 and the channel CH2 are then transmitted or received. In the channel CH1 and the channel CH2, different frequency bands are used, and different data are transmitted and received. In the following, the case of UWB (in the MB-OFDM system based on WiMedia PHY Specification version 1.1) is described by way of illustration.

The first antenna 11 and the second antenna 12 send signals to be transmitted to the air and capture signals to be received from the air. The first antenna 11 and the second antenna 12 are placed close to each other. The first antenna 11 and the second antenna 12 are disposed adjacent to each other. Both of the first antenna 11 and the second antenna 12 can process all the frequencies handled by the first transmitting/receiving circuit 15 and the second transmitting/receiving circuit 16, which are described later. It is assumed, for example, that the first transmitting/receiving circuit 15 performs transmitting and receiving processing of the band group 1 (3168 to 4752 GHz), and the second transmitting/receiving circuit 16 performs transmitting and receiving processing of the band group 3 (6336 to 7920 GHz). The signals of the band group 1 correspond to the channel CH1, and the signals of the band group 3 correspond to the channel CH2. Thus, the first transmitting/receiving circuit 15 and the second transmitting/receiving circuit 16 perform transmitting and receiving processing on the signals of different channels. Although an example of a specific operation is described hereinafter with use of the channel CH1 and the channel CH2, the number of channels is not limited to two. The exemplary embodiment is equally applicable to radio communication performed using two or more channels. For example, radio communication with the band groups 4, 5 and 6 may be performed.

The first antenna 11 and the second antenna 12 send the transmission signals of the band group 1 and the band group 3 to the air. Further, the first antenna 11 and the second antenna 12 capture the reception signals of the band group 1 and the band group 3 from the air. In this example, the first antenna 11 and the second antenna 12 are wide-band antennas compatible with the 3 to 10 GHz band including the band group 1 and the band group 3. Thus, the first antenna 11 and the second antenna 12 can transmit and receive both the signals of the band group 1 corresponding to the channel CH1 and the signals of the band group 3 corresponding to the channel CH2. The first antenna 11 sends and captures the signals in the 3 to 10 GHz band. The second antenna 12 also sends and captures the signals in the 3 to 10 GHz band. By using wide-band antennas as the first antenna 11 and the second antenna 12, it is possible to receive and transmit the signals of the channel CH1 and the channel CH2.

The first antenna 11 and the second antenna 12 are connected to the second branching circuit 14. The second branching circuit 14 combines the received signals received by the first antenna 11 and the second antenna 12. Further, the second branching circuit 14 divides the transmission signal from the transmission line 17, which is described later, between the first antenna 11 and the second antenna 12. The second branching circuit 14 has three ports. Specifically, the second branching circuit 14 has a port connected to the first antenna 11, a port connected to the second antenna 12, and a port connected to the transmission line 17. The second branching circuit 14 has an isolation function to prevent interference between the first antenna 11 and the second antenna 12.

The second branching circuit 14 is connected to the transmission line 17. The transmission line 17 is a metal line, for example, and it is connected to the first branching circuit 13. Thus, the transmission line 17 is placed between the second branching circuit 14 and the first branching circuit 13. The transmission line 17 may be a coaxial cable or a wiring pattern. The first branching circuit 13 and the second branching circuit 14 are connected through the transmission line 17. The transmission line 17 is a circuit connecting the second branching circuit 14 and the first branching circuit 13. The transmission line 17 is capable of transmitting all the frequencies handled by the first transmitting/receiving circuit 15 and the second transmitting/receiving circuit 16. Thus, the signals of the band group 1 and the band group 3 pass through the transmission line 17. The received signal combined by the second branching circuit 14 is input to the first branching circuit 13 through the transmission line 17. Further, the transmission signal from the first branching circuit 13 is input to the second branching circuit 14 through the transmission line 17.

The first branching circuit 13 divides the received signal combined by the second branching circuit 14. The divided received signal is transferred to the first terminal 18 or the second terminal 19. The first branching circuit 13 has three ports. Specifically, the first branching circuit 13 has a port connected to the first terminal 18, a port connected to the second terminal 19 and a port connected to the transmission line 17. The first branching circuit 13 has an isolation function to prevent the received signal to be handled by the first transmitting/receiving circuit 15 and the received signal to be handled by the second transmitting/receiving circuit 16 from interfering with each other. The first branching circuit 13 further has a filtering function to divide the received signal according to frequency. For example, the first branching circuit 13 allocates the received signal of the band group 1 to the first terminal 18 for the channel CH1 and allocates the received signal of the band group 3 to the second terminal 19 for the channel CH2.

Figure 2:
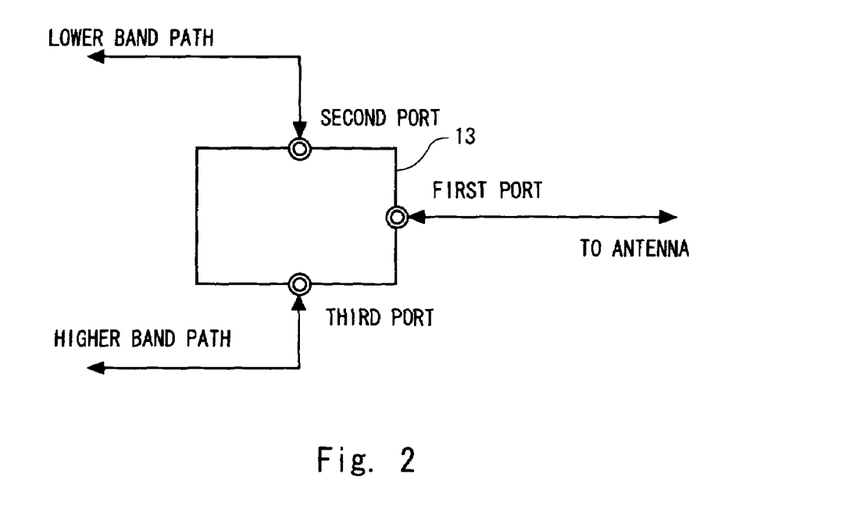
FIG. 2 is a view showing the configuration of a first branching circuit used in the radio communication apparatus according to the exemplary embodiment of the present invention.
Figure 3:
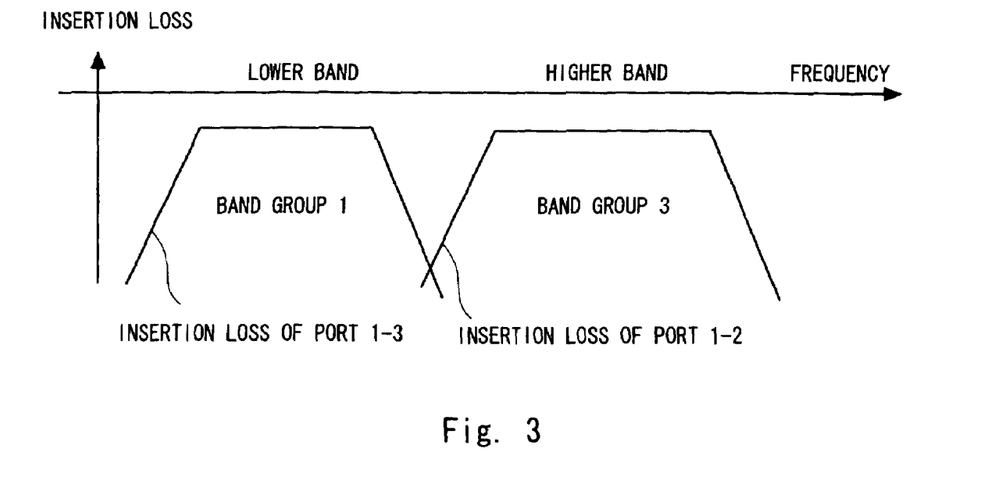
FIG. 3 is a graph showing the characteristics of the first branching circuit used in the radio communication apparatus according to the exemplary embodiment of the present invention.

The configuration of the first branching circuit 13 is described hereinafter with reference to FIGS. 2 and 3. FIG. 2 is a block diagram showing the configuration of the first branching circuit 13. FIG. 3 is a view showing the characteristics of the first branching circuit 13. In FIG. 3, the horizontal axis indicates a frequency, and the vertical axis indicates an insertion loss. Referring to FIG. 2, the first branching circuit 13 has a first port, a second port and a third port. The first port is located on the antenna side and connected to the transmission line 17. The second port is located on the first transmitting/receiving circuit 15 side and connected to the first terminal 18. The third port is located on the second transmitting/receiving circuit 16 side and connected to the second terminal 19.

The first branching circuit 13 has the transfer characteristics as shown in FIG. 3. The transmission loss characteristics from the first port to the third port are such that attenuation is large in a lower frequency band. Accordingly, a signal in the lower frequency band is attenuated from the first port to the third port. Because a transmission loss from the first port to the third port is small in a higher frequency band, a signal in the higher frequency band passes from the first port to the third port. On the other hand, a transmission loss from the first port to the second port is large in the higher frequency band. Accordingly, a signal in the higher frequency band is attenuated from the first port to the second port. Because a transmission loss from the first port to the second port is small in the lower frequency band, a signal in the lower frequency band passes from the first port to the second port. Therefore, if a received signal in the higher frequency band is input to the first port, it is not transferred to the second port. On the other hand, if a received signal in the lower frequency band is input to the first port, it is not transferred to the third port.

Therefore, the received signal in the band group 3 is transferred from the first port to the third port. The received signal in the band group 3 is not output from the second port because attenuation from the first port to the second port is large. On the other hand, the received signal in the band group 1 is transferred from the first port to the second port. The received signal in the band group 1 is not output from the third port because attenuation from the first port to the third port is large.

As described above, the first branching circuit 13 has the bandpass filter characteristics. The first branching circuit 13 transmits the signals of the band group 1 and attenuates signals in the other band to the first terminal 18. Further, the first branching circuit 13 transmits the signals of the band group 3 and attenuates signals in the other band to the second terminal 19. Because there is at least a certain degree of isolation between the first terminal 18 and the second terminal 19, the signals in all frequency bands are not transferred between the second port and the third port.

The received signal of the band group 1 is input to the first terminal 18. The received signal of the band group 1 is supplied from the first branching circuit 13 to the first transmitting/receiving circuit 15 through the first terminal 18. The first transmitting/receiving circuit 15 performs transmitting and receiving processing on the signal of the band group 1. Specifically, the transmitting/receiving circuit 15 performs demodulation of the received signal of the band group 1. The received signal for the channel CH1 is thereby converted into a baseband signal. Further, the transmitting/receiving circuit 15 performs modulation so as to convert the baseband signal into the transmission signal for the channel CH1.

The received signal of the band group 3 is input to the second terminal 19. The received signal of the band group 3 is supplied from the first branching circuit 13 to the second transmitting/receiving circuit 16 through the second terminal 19. The second transmitting/receiving circuit 16 performs transmitting and receiving processing on the signal of the band group 3. Specifically, the second transmitting/receiving circuit 16 performs demodulation of the received signal of the band group 3. The received signal for the channel CH2 is thereby converted into a baseband signal. Further, the second transmitting/receiving circuit 16 performs modulation of the baseband signal. The baseband data is thereby converted into the transmission signal for the channel CH2.

The first transmitting/receiving circuit 15 and the second transmitting/receiving circuit 16 operate in an exclusive manner. Thus, while one transmitting/receiving circuit is operating, the other transmitting/receiving circuit does not operate. Specifically, the first transmitting/receiving circuit 15 operates when transmitting or receiving signals of the band group 1, and the second transmitting/receiving circuit 16 operates when transmitting or receiving signals of the band group 3. In this manner, while one transmitting/receiving circuit is in operation, the other transmitting/receiving circuit is in non-operation. Accordingly, radio communication is performed in either the channel CH1 or the channel CH2.

For example, in the case of transmitting data of the channel CH1, the first transmitting/receiving circuit 15 modulates the data. A transmission signal of the band group 1 is thereby generated. The transmission signal is then transferred to the first antenna 11 and the second antenna 12 through the first branching circuit 13, the transmission line 17 and the second branching circuit 14. The first antenna 11 and the second antenna 12 then output the transmission signal of the band group 1 to the air.

In the case of transmitting data of the channel CH2, the second transmitting/receiving circuit 16 modulates the data. A transmission signal of the band group 3 is thereby generated. The transmission signal is then transferred to the first antenna 11 and the second antenna 12 through the first branching circuit 13, the transmission line 17 and the second branching circuit 14. The first antenna 11 and the second antenna 12 then output the transmission signal of the band group 3 to the air.

On the other hand, if the first antenna 11 and the second antenna 12 capture received signals, the received signals are combined by the second branching circuit 14. Specifically, the received signal received by the first antenna 11 and the received signal received by the second antenna 12 are power-combined by the second branching circuit 14. The combined received signal is transferred to the first branching circuit 13 through the transmission line 17.

The first branching circuit 13 allocates the received signal to the first terminal 18 or the second terminal 19 according to the frequency. If the received signal is the band group 1, it is transferred to the first terminal 18 through the first port and the second port of the first branching circuit 13. The first transmitting/receiving circuit 15 then performs demodulation of the received signal of the band group 1. On the other hand, if the received signal is the band group 3, it is transferred to the second terminal 19 through the first port and the third port of the first branching circuit 13. The second transmitting/receiving circuit 16 then performs demodulation of the received signal of the band group 3.

The first antenna 11 and the second antenna 12 are designed to be able to simultaneously capture radio waves arriving from different directions under the multipath environment. It is thereby possible to achieve a high diversity effect. The radio communication apparatus 100 according to the exemplary embodiment is particularly suitable for use in a room where radio waves are reflected by a floor or walls.

Figure 4:
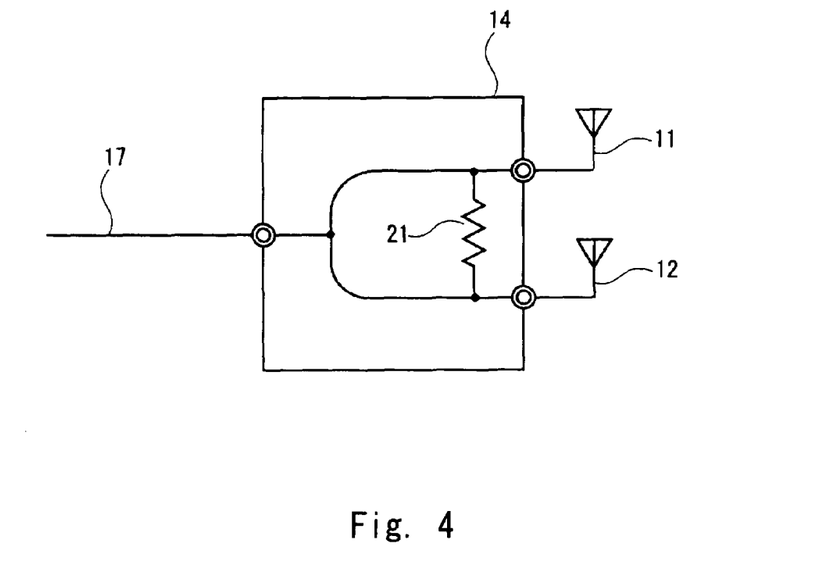
FIG. 4 is a circuit diagram showing the configuration of a second branching circuit used in the radio communication apparatus according to the exemplary embodiment of the present invention.

The circuit configurations of the second branching circuit 14 and the first branching circuit 13 are described hereinafter with reference to FIGS. 4 and 5. FIG. 4 is a circuit diagram showing an example of the configuration of the second branching circuit 14, and FIG. 5 is a circuit diagram showing an example of the configuration of the first branching circuit 13.

Referring to FIG. 4, the second branching circuit 14 has three ports. Specifically, a port on the first antenna 11, a port on the second antenna 12 and a port on the transmission line 17 are disposed in the second branching circuit 14. A resistor 21 for matching impedance is placed between the port on the first antenna 11 and the port on the second antenna 12. The received signal received by the first antenna 11 and the received signal received by the second antenna 12 are combined and output to the port on the transmission line 17. Further, the transmission signal from the transmission line 17 is divided by the second branching circuit 14 and input to the first antenna 11 and the second antenna 12. The second branching circuit 14 divides the power of the transmission signal by two and outputs the divided signals to the first antenna 11 and the second antenna 12. The second branching circuit 14 serves as a power divider/combiner that divides or combines the power of the received signal. The second branching circuit 14 has an isolation function to prevent the first antenna 11 and the second antenna 12 from interfering with each other. Thus, the received signal received by the first antenna 11 is not sent to the second antenna 12, and the received signal received by the second antenna 12 is not sent to the first antenna 11.

Figure 5:
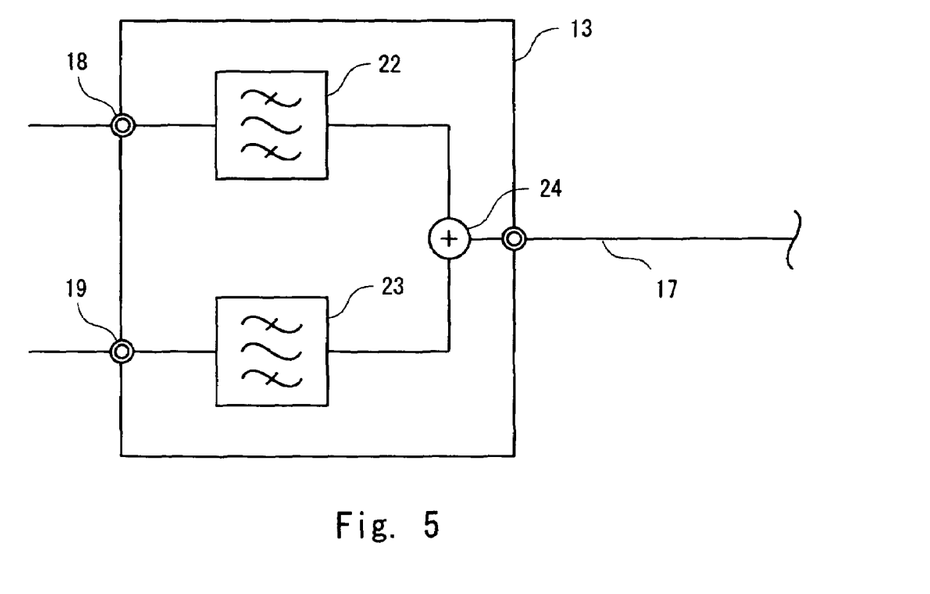
FIG. 5 is a circuit diagram showing the configuration of the first branching circuit used in the radio communication apparatus according to the exemplary embodiment of the present invention.

Referring to FIG. 5, the first branching circuit 13 has three ports. Specifically, the first port on the transmission line 17, the second port on the first terminal 18 and the third port on the second terminal 19 are disposed in the first branching circuit 13. A splitter/combiner circuit 24 is attached to the first port. Although the splitter/combiner circuit 24 may be implemented by various ways, an example is a power splitter. If the splitter/combiner circuit 24 is a power splitter, the power splitter is a circuit that combines and divides a power, and the same circuit as the second branching circuit 14 may be used, for example. A filter 22 is placed between the first port and the second port. The filter 22 is a bandpass filter (BPF), and it transmits signals of the band group 1 and blocks signals of the band group 3. Further, a filter 23 is placed between the first port and the third port. The filter 23 is a BPF, and it transmits signals of the band group 3 and blocks signals of the band group 1. Accordingly, signals of the band group 1 are input to the first terminal 18, and signals of the band group 3 are input to the second terminal 19. In this manner, the filter 22 and the filter 23 transmit signals in different bands. In other words, the passing bands of the filter 22 and the filter 23 are different from each other. As the filter 22 and the filter 23, a low-pass filter or a high-pass filter may be used instead of a bandpass filter.

Further, there is at least a certain degree of isolation between the first terminal 18 and the second terminal 19. Therefore, the transmission signal from the first terminal 18 is not input to the second terminal 19, and the transmission signal from the second terminal 19 is not input to the first terminal 18. Therefore, a control signal for controlling switching is not necessary between the first branching circuit 13 and the antennas, thereby allowing simplification of the configuration.

Figure 6:
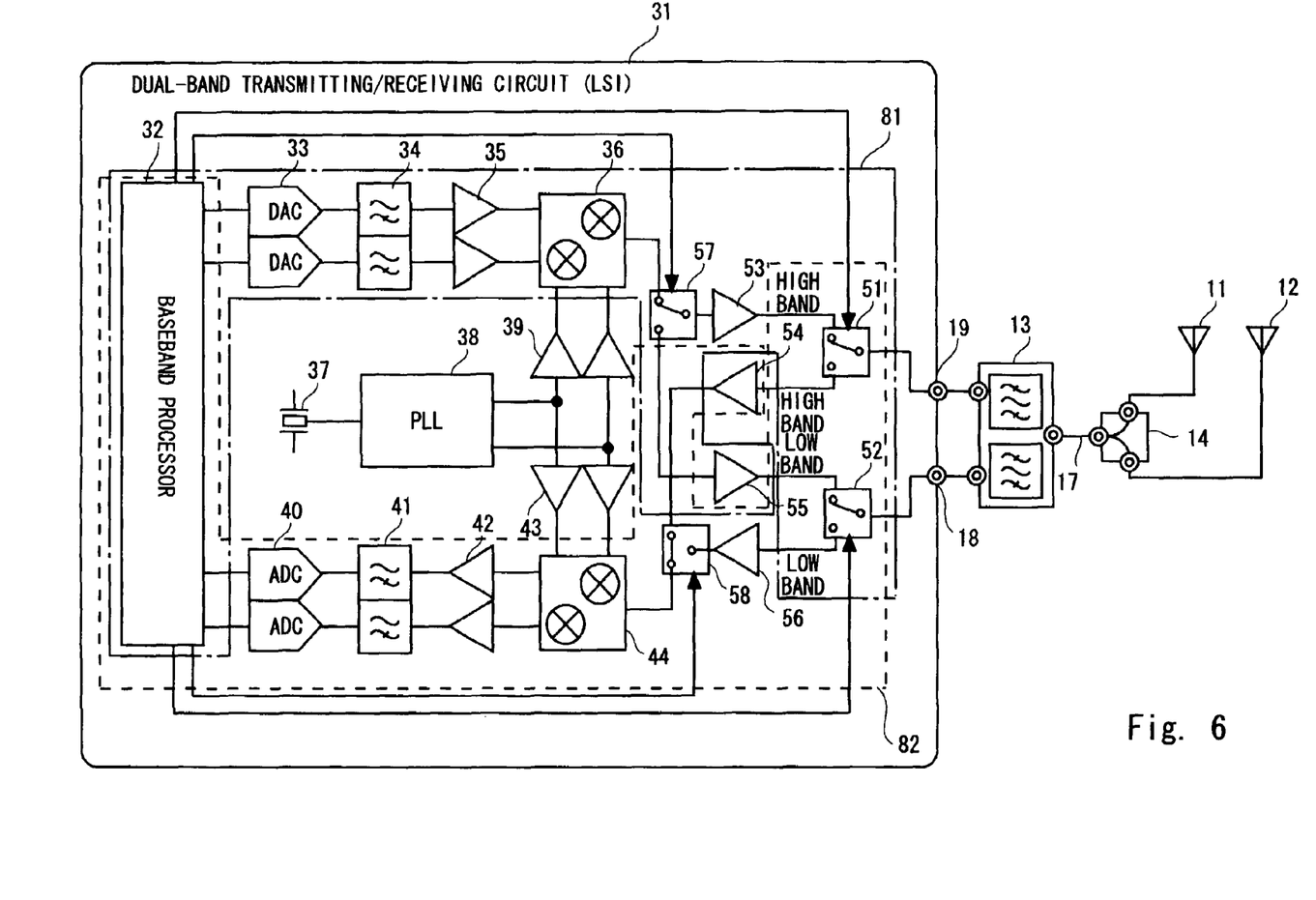
FIG. 6 is a circuit diagram showing a specific example of the configuration of the radio communication apparatus according to the exemplary embodiment of the present invention.

A specific example of the configuration of the radio communication apparatus 100 according to the exemplary embodiment is described hereinafter with reference to FIG. 6. FIG. 6 is a circuit diagram showing the configuration of the radio communication apparatus 100. In the radio communication apparatus 100 shown in FIG. 6, the first transmitting/receiving circuit 15 and the second transmitting/receiving circuit 16 are included in a dual-band transmitting/receiving circuit 31 (LSI 31). Thus, the dual-band transmitting/receiving circuit 31 performs transmitting and receiving processing on the signals of the channel CH1 and the channel CH2. The dual-band transmitting/receiving circuit 31 is composed of a single LSI. The basic configuration of the radio communication apparatus 100 shown in FIG. 6 is the same as that shown in FIG. 1, and the identical components are not repeatedly described below. Thus, the configurations of the first antenna 11, the second antenna 12, the first branching circuit 13, the second branching circuit 14 and the transmission line 17 are not described below.

The dual-band transmitting/receiving circuit 31 is a radio circuit including the first terminal 18 and the second terminal 19. The first terminal 18 and the second terminal 19 are connected to the first branching circuit 13 as described earlier. The dual-band transmitting/receiving circuit 31 further includes a baseband processor 32, a digital-to-analog converter (DAC) 33, a filter 34, an amplifier 35, a quadrature modulator 36, an oscillator 37, a PLL circuit 38, an amplifier 39, an analog-to-digital converter (ADC) 40, a filter 41, an amplifier 42, an amplifier 43, a quadrature demodulator 44, a switch 51, a switch 52, an amplifier 53, an amplifier 54, an amplifier 55, an amplifier 56, a switch 57 and a switch 58, so as to perform transmitting and receiving processing.

The dual-band transmitting/receiving circuit 31 performs quadrature modulation and demodulation. Specifically, the dual-band transmitting/receiving circuit 31 performs demodulation of a baseband quadrature signal that is output from the baseband processor 32. A transmission signal of the band group 1 or the band group 3 is thereby generated. Further, the dual-band transmitting/receiving circuit 31 performs demodulation of a quadrature signal of the band group 1 or the band group 3. A baseband received signal is thereby generated.

The components for performing transmission are described hereinafter. In the dual-band transmitting/receiving circuit 31, the DAC 33, the filter 34, the amplifier 35, the quadrature modulator 36, the oscillator 37, the PLL circuit 38 and the amplifier 39 are included for modulating signals. The oscillator 37 and the PLL circuit 38 are used also for demodulating signals, as described later. Thus, the oscillator 37 and the PLL circuit 38 serve as a common circuit part that is used for both modulation and demodulation. Further, the baseband processor 32, the DAC 33, the filter 34, the amplifier 35, the quadrature modulator 36, the switch 51, the switch 52, the switch 57, the amplifier 53 and the amplifier 55 serve as a transmitting circuit 81 for transmitting signals. In other words, the baseband processor 32, the DAC 33, the filter 34, the amplifier 35, the quadrature modulator 36, the switch 51, the switch 52, the switch 57, the amplifier 53 and the amplifier 55, which are surrounded by the alternate long and short dashed lines in FIG. 6, constitute the transmitting circuit 81.

The baseband processor 32 outputs a baseband signal. A digital signal from the baseband processor 32 is input to the DAC 33. Because quadrature modulation is performed in this example, two signal lines are illustrated from the baseband processor 32. One of the two signal lines indicates an in-phase channel component (I-channel component), and the other indicates a quadrature-phase channel component (Q-channel component).

The DAC 33 converts the digital signal from the baseband processor 32 into an analog signal and outputs it to the filter 34. The filter 34 is a low-pass filter for noise reduction. The filter 34 transmits a baseband signal and blocks a signal with a higher frequency than the baseband. Noise is thereby removed. The signal from the filter 34 is amplified by the amplifier 35 and then input to the quadrature modulator 36. The quadrature modulator 36 combines the in-phase channel component and the quadrature-phase channel component.

Further, a LO (local-oscillating) signal from the common circuit part including the oscillator 37 and the PLL circuit 38 is also input to the quadrature modulator 36 through the amplifier 39. The oscillator 37 is a crystal oscillator, for example, and it sends out a signal with a given frequency. The signal from the oscillator 37 is input to the PLL circuit 38. The PLL circuit 38 outputs a LO signal. Because quadrature modulation is performed, two of the LO signal lines, which have the difference of 90 degrees of the phase with each other, are connected between the PLL circuit 38 and the quadrature modulator 36. Each LO signal is amplified by the amplifier 39 and input to the quadrature modulator 36. The quadrature modulator 36 then converts the frequency of the transmission signal from the baseband processor 32 based on the LO signal. The transmission signal with a frequency of the band group 1 or the band group 3 is thereby generated. Specifically, the transmission signal of the band group 1 is generated in the case of performing transmission through the channel CH1, and the transmission signal of the band group 3 is generated in the case of performing transmission through the channel CH2. In this manner, the quadrature modulator 36 is capable of modulating the signals of the band group 1 and the band group 3. The quadrature modulator 36 modulates the baseband signal and outputs the transmission signal.

The transmission signal from the quadrature modulator 36 is input to the switch 57. Further, a control signal from the baseband processor 32 is also input to the switch 57. The switch 57 switches channels based on the control signal from the baseband processor 32. For example, in the case of performing transmission through the channel CH1, the switch 57 connects the quadrature modulator 36 to the low-band amplifier 55. The transmission signal of the band group 1 is thereby input to the amplifier 55. On the other hand, in the case of performing transmission through the channel CH2, the switch 57 connects the quadrature modulator 36 to the high-band amplifier 53. The transmission signal of the band group 3 is thereby input to the amplifier 53. In this manner, the switch 57 selects which of the amplifier 53 and the amplifier 55 to use according to the channel. By selectively using the amplifier 53 or the amplifier 55 according to the frequency, it is possible to use an amplifier which is not a wide-band amplifier. This enables stabilization of the output from the amplifier.

For example, when performing transmission in a high frequency band, the switch 57 connects the amplifier 53 and the quadrature modulator 36 according to the control signal. The transmission signal is amplified by the amplifier 53 and input to the switch 51. On the other hand, when performing transmission in a low frequency band, the switch 57 connects the amplifier 55 and the quadrature modulator 36 according to the control signal. In this case, the transmission signal is amplified by the amplifier 55 and input to the switch 52. In this manner, the switch 57 is switched according to a channel to use.

The transmission signal amplified by the amplifier 53 is input to the switch 51. Further, a control signal from the baseband processor 32 is input to the switch 51. The control signal is a signal for switching transmission and reception. When performing transmission, the switch 51 connects the amplifier 53 to the second terminal 19. The transmission signal of the band group 3 is thereby input to the second terminal 19. The transmission signal of the band group 3 then passes through the first branching circuit 13, the transmission line 17 and the second branching circuit 14 and is sent to the air from the first antenna 11 and the second antenna 12.

On the other hand, the transmission signal amplified by the amplifier 55 is input to the switch 52. Further, a control signal from the baseband processor 32 is input to the switch 52. The control signal is a signal for switching transmission and reception. When performing transmission, the switch 52 connects the amplifier 55 to the first terminal 18. The transmission signal of the band group 1 is thereby input to the first terminal 18. The transmission signal of the band group 1 then passes through the first branching circuit 13, the transmission line 17 and the second branching circuit 14 and is sent to the air from the first antenna 11 and the second antenna 12.

Processing of demodulating a received signal is described hereinafter. The baseband processor 32, the ADC 40, the filter 41, the amplifier 42, the amplifier 43, the quadrature demodulator 44, the switch 58, the amplifier 56, the amplifier 54, the switch 51 and the switch 52 serve as a receiving circuit 82. In other words, the baseband processor 32, the ADC 40, the filter 41, the amplifier 42, the amplifier 43, the quadrature demodulator 44, the switch 58, the amplifier 56, the amplifier 54, the switch 51 and the switch 52, which are surrounded by the dotted line of FIG. 6, constitute the receiving circuit 82. As described above, the received signal of the band group 1 is input to the first terminal 18. On the other hand, the received signal of the band group 3 is input to the second terminal 19. The received signal of the band group 1 is described firstly.

The received signal of the band group 1 is input to the switch 52 through the first terminal 18. As described earlier, the control signal for switching transmission and reception is also input to the switch 52 from the baseband processor 32. Thus, when performing reception, the switch 52 connects the first terminal 18 to the amplifier 56. The received signal of the band group 1 is thereby amplified by the amplifier 56 and input to the switch 58. As described earlier, the control signal for switching channels is also input to the switch 58 from the baseband processor 32. Thus, the switch 58 connects the amplifier 56 to the quadrature demodulator 44. The received signal from the amplifier 56 is thereby input to the quadrature demodulator 44.

Further, the PLL signal from the PLL circuit 38 is also input to the quadrature demodulator 44, like the quadrature modulator 36, through the amplifier 43. The quadrature demodulator 44 lowers the frequency to the baseband based on the PLL signal and acquires the quadrature signal. In other words, the quadrature demodulator 44 generates baseband signals with a phase shifted by 90°. Two signal lines are illustrated from the quadrature demodulator 44 to the baseband processor 32. The signal converted into the baseband is amplified by the amplifier 42 and input to the filter 41.

The filter 41 is a channel filter, and a low-pass filter (LPF) may be used, for example. It transmits a baseband signal and blocks a signal with a higher frequency than the baseband. The analog signal from the filter 41 is converted into a digital signal by the analog-to-digital converter (ADC) 40. The digital signal from the ADC 40 is input to the baseband processor 32.

The dual-band transmitting/receiving circuit 31 performs transmitting and receiving processing as described above. The switch 51 and the switch 52 that switch transmission and reception are included in the dual-band transmitting/receiving circuit 31. Further, the switch 57 and the switch 58 that switch channels are included in the dual-band transmitting/receiving circuit 31. There is thus no need to place a control circuit in addition to the LSI for the dual-band transmitting/receiving circuit 31. This allows simplification of the configuration of the circuit for performing transmission and reception. Specifically, there is no need to add a control circuit that outputs a control signal at the position between the antennas and the first branching circuit 13. It is thereby possible to achieve a high diversity effect with the circuit having a simple configuration. More specifically, there is no need to place a control circuit and lines for control signals at the position between the antennas and the branching circuit with filtering function, which is difficult to be incorporated into the LSI. Because the lines for control signals are completely included in the LSI, integration into LSI is easily implemented. This enables simplification of the circuit configuration.

Figure 7:
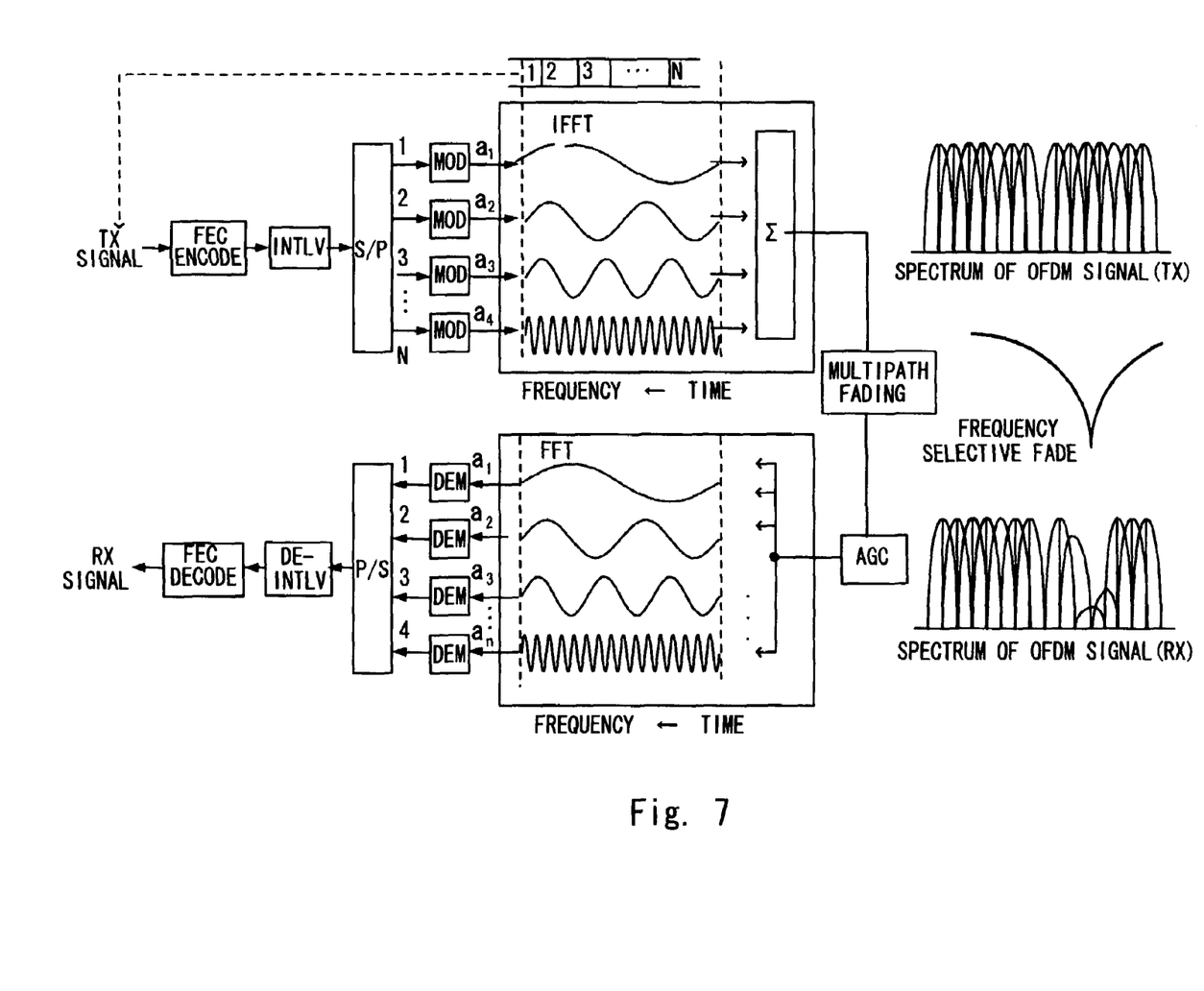
FIG. 7 is a view to describe processing in a baseband processor of the radio communication apparatus according to the exemplary embodiment of the present invention.

Processing in the baseband processor 32 is described hereinafter with reference to FIG. 7. FIG. 7 is a view to describe processing in the baseband processor 32. The processing of transmitting data is described firstly with reference to FIG. 7. An OFDM signal for transmission (TX) and an OFDM signal for reception (RX) are shown in the right part of FIG. 7. Further, a transfer function is shown between the OFDM signal for transmission (TX) and the OFDM signal for reception (RX). By the transfer function, the OFDM signal for transmission (TX) becomes the OFDM signal for reception (RX).

Forward error correction (FEC) encoding is performed on the OFDM signal TX based on transmission data. An error correcting code is thereby added. As described above, the spectrum waveform of the OFDM signal TX before performing the FEC encoding is illustrated. After performing the FEC encoding, interleaving is performed. Data is thereby rearranged. After rearrangement, serial-to-parallel conversion is performed. Serial transmission data is thereby converted into parallel transmission data. The serial-to-parallel conversion is performed in order to transmit data using a plurality of carriers at a time. Each of the plurality of carriers is called a subcarrier.

Then, subcarrier modulation is performed on each of the parallel transmission data. For example, subcarrier modulation is performed on each subcarrier by multi-level quadrature amplitude modulation (QAM) or the like. The signal after subcarrier modulation is then inverse Fourier transformed as a signal for each subcarrier frequency. For example, inverse discrete Fourier transform is performed by inverse fast Fourier transform (IFFT). After that, the combined signal is output to the DAC 33 shown in FIG. 6 through a multipath fading transmission line. In this manner, modulation for transmission is performed for each subcarrier. Further, multicarrier multiplexing is done by digital batch processing using IFFT. After performing subcarrier modulation of the transmission data, inverse Fourier transform is performed to combine the subcarriers. As a result of combining the subcarriers, a multiplexed multicarrier signal is output. As shown in FIG. 7, the OFDM signal for transmission (TX) becomes the OFDM signal for reception (RX) by the transfer function.

Processing of receiving data is described hereinafter. The processing of receiving data is the inverse of the processing of transmitting data. A baseband received signal is supplied from the ADC 40 shown in FIG. 6 through the multipath fading transmission line. Then, the level of the received signal is adjusted by an automatic gain control (AGC). After adjusting the level, the parallel received data is Fourier transformed. For example, the digital received signal is discrete Fourier transformed by fast Fourier transform (FFT) to divide the signal into subcarriers.

After dividing the signal into subcarriers, subcarrier demodulation is performed. The data is thereby demodulated for each subcarrier. After that, parallel-to-serial conversion is performed. The parallel received data is thereby converted into serial received data. Then, deinterleaving is performed on the serial received data. The data is thereby rearranged into its original order. Then, FEC decoding is performed, and the data is read. In this manner, demodulation for reception is performed for each subcarrier. Further, separation or division of the multicarrier is done by digital batch processing using FFT. In this manner, the received signal is Fourier transformed and the multicarrier is separated or divided. After separating or dividing the multicarrier into subcarriers, subcarrier demodulation is performed.

As described above, OFDM modulation and demodulation are performed in the baseband processor 32. Modulation and demodulation may be performed by different circuits. In such a case, a radio communication apparatus for transmission and a radio communication apparatus for reception are prepared separately. The above-described configuration may be applied only to the radio communication apparatus for transmission or only to the radio communication apparatus for reception.

By the above configuration, it is possible to simplify the ultra wide-band (UWB) high-band and low-band circuit configuration. By combining the received signals from the two antennas without any cross-correlation, it is possible to easily achieve a diversity effect. Further, the received signals from the two wide-band antennas are combined. Specifically, the first antenna 11 and the second antenna 12 are wide-band antennas capable of transmitting and receiving the signals in the frequency bands of the channel CH1 and the channel CH2. It is thereby possible to achieve a high diversity effect in a wide band. The above-described configuration may be applied to a wireless local area network (W-LAN).

The present invention is not limited to the above-described exemplary embodiment, and various changes may be made without departing from the scope of the invention. For example, although the above description is given on the assumption that the transmission method is multiband-orthogonal frequency division multiplexing (MB-OFDM), the transmission method is not particularly limited, as long as radio communication is performed through two or more channels. Further, the present invention may be applied to a radio communication apparatus based on WIMAX standards or a radio communication apparatus based on Wi-Fi standards. Furthermore, the present invention may be applied to a diversity circuit integrating a plurality of wireless standards. Three or more antennas may be used, as a matter of course. Further, the dual-band transmitting/receiving circuit 31 may be a circuit composed of different chips for different channels. Specifically, the first transmitting/receiving circuit 15 having the first terminal 18 and the second transmitting/receiving circuit 16 having the second terminal 19 may be composed of physically different chips.

Although the first transmitting/receiving circuit 15 and the second transmitting/receiving circuit 16 shown in FIG. 1 operate in an exclusive manner in the above description, the first transmitting/receiving circuit 15 and the second transmitting/receiving circuit 16 may operate simultaneously. For example, when simultaneously transmitting or receiving signals of 2.4 GHz and 5 GHz by W-LAN or a mobile phone, the first transmitting/receiving circuit 15 and the second transmitting/receiving circuit 16 operate simultaneously. Thus, signals are simultaneously output from the first terminal 18 of the first transmitting/receiving circuit 15 and the second terminal 19 of the second transmitting/receiving circuit 16. Then, signals in different frequency bands are simultaneously output from the first antenna 11 and the second antenna 12. In this manner, when simultaneously transmitting the signals of different channels, the signals in different frequency bands are combined by the first branching circuit 13.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A radio communication apparatus, comprising:
a radio circuit including a first terminal to transmit or receive a signal having a frequency belonging to a first frequency band and a second terminal to receive a signal having a frequency belonging to a second frequency band different from the first frequency band, to perform given processing on a signal input through the first terminal or the second terminal;
a first branching circuit configured to output an input signal to either one of the first terminal and the second terminal according to a frequency band to which a frequency of the input signal belongs;
a first antenna and a second antenna mounted separately and capable of receiving signals having frequencies belonging to the first frequency band and the second frequency band; and
a second branching circuit configured to combine a signal, as a combined signal, received by the first antenna and a signal received by the second antenna and supplies the combined signal to the first branching circuit,
wherein the radio circuit outputs the signal having the frequency belonging to the first frequency band from the first terminal and outputs the signal having the frequency belonging to the second frequency band from the second terminal,
wherein the first branching circuit outputs the signal output from the first terminal or the signal output from the second terminal,
wherein the second branching circuit divides the signal output from the first branching circuit between the first antenna and the second antenna,
wherein each of the first antenna and the second antenna sends the signal divided by the second branching circuit, and
wherein the radio circuit comprises:
a first transmitting/receiving circuit configured to output the signal having the frequency belonging to the first frequency band to the first terminal and receive the signal having the frequency belonging to the first frequency band from the first terminal; and
a second transmitting/receiving circuit configured to output the signal having the frequency belonging to the second frequency band to the second terminal and receive the signal having the frequency belonging to the second frequency band from the second terminal.

2. The radio communication apparatus according to claim 1, wherein the second branching circuit divides the signal output from the first branching circuit between the first antenna and the second antenna in such a way that a power of the signal to be received by the first antenna and a power of the signal to be received by the second antenna are substantially the same.

3. The radio communication apparatus according to claim 1, wherein the signal having the frequency belonging to the second frequency band is not output from the second terminal while the signal having the frequency belonging to the first frequency band is output from the first terminal, and
wherein the signal having the frequency belonging to the first frequency band is not output from the first terminal while die signal having the frequency belonging to the second frequency band is output from the second terminal.

4. The radio communication apparatus according to claim 1, wherein the first transmitting/receiving circuit is stopped while the second transmitting/receiving circuit is in operation, and the second transmitting/receiving circuit is stopped while the first transmitting/receiving circuit is in operation.

5. The radio communication apparatus according to claim 1, further comprising:
a transmission line configured to connect the first branching circuit and the second branching circuit.

6. The radio communication apparatus according to claim 1, wherein the first branching circuit comprises:
a first filter configured to transmit the signal having the frequency belonging to the first frequency band and block the signal having the frequency belonging to the second frequency band; and
a second filter configured to transmit the signal having the frequency belonging to the second frequency band and block the signal having the frequency belonging to the first frequency band.

7. A radio communication apparatus, comprising:
a radio circuit including a first terminal to transmit or receive a signal having a frequency belonging to a first frequency band and a second terminal to receive a signal having a frequency belonging to a second frequency band different from the first frequency band, to perform given processing on a signal input through the first terminal or the second terminal;

a first branching circuit configured to output an input signal to either one of the first terminal and the second terminal according to a frequency band to which a frequency of the input signal belongs;

a first antenna and a second antenna mounted separately and capable of receiving signals having frequencies belonging to the first frequency band and the second frequency band; and a second branching circuit configured to combine a signal, as a combined signal, received by the first antenna and a signal received by the second antenna and supplies the combined signal to the first branching circuit, wherein the radio circuit outputs the signal having the frequency belonging to the first frequency band from the first terminal and outputs the signal having the frequency belonging to the second frequency band from the second terminal, wherein the first branching circuit outputs the signal output from the first terminal or the signal output from the second terminal, wherein the second branching circuit divides the signal output from the first branching circuit between the first antenna and the second antenna, wherein each of the first antenna and the second antenna sends the signal divided by the second branching circuit, and wherein the radio circuit comprises:

a transmitting circuit configured to output the signal having the frequency belonging to the first frequency band to the first terminal and output the signal having the frequency belonging to the second frequency band to the second terminal; and a receiving circuit configured to receive the signal having the frequency belonging to the first frequency band from the first terminal and receive the signal having the frequency belonging to the second frequency band from the second terminal.

\* \* \* \* \*